United States Patent [19]
Buckholtz et al.

[11] Patent Number: 5,368,832
[45] Date of Patent: Nov. 29, 1994

[54] ZERO DISCHARGE PROCESS FOR MANUFACTURING OF PHOSPHOROUS ACID AND HYPOPHOSPHOROUS ACID

[75] Inventors: Harry E. Buckholtz, Lewiston; Mohan S. Saran, Grand Island, both of N.Y.; Frederick C. Leitert, Madison; David A. Flautt, Ashtabula, both of Ohio

[73] Assignee: Occidental Chemical Corporation, Niagara Falls, N.Y.

[21] Appl. No.: 711,841

[22] Filed: Jun. 7, 1991

[51] Int. Cl.$^5$ .................. C01B 25/165; C01B 25/163
[52] U.S. Cl. .................................... 423/316; 423/317
[58] Field of Search ............... 423/167, 307, 316, 317, 423/321 R

[56] References Cited

U.S. PATENT DOCUMENTS

| | | | |
|---|---|---|---|
| 2,595,198 | 4/1952 | Leffore et al. | 423/316 |
| 2,711,388 | 6/1955 | Mottern et al. | 423/317 |
| 4,248,846 | 2/1981 | Hill | 423/317 |
| 4,278,647 | 7/1981 | Jodden et al. | 423/307 |
| 4,330,515 | 5/1982 | Campbell | 423/316 |
| 4,380,531 | 4/1983 | Wisnouskas | 423/316 |

FOREIGN PATENT DOCUMENTS

| | | | |
|---|---|---|---|
| 0007493 | 2/1980 | European Pat. Off. | 423/317 |
| 254166 | 11/1986 | Japan . | |
| 7900920 | 11/1979 | WIPO | 423/316 |

Primary Examiner—Michael Lewis
Assistant Examiner—Stephen G. Kalinchak
Attorney, Agent, or Firm—Wayne A. Jones; Richard D. Fuerle

[57] ABSTRACT

Disclosed is a method of making phosphorous acid or hypophosphorous acid by reacting hydrogen chloride with a sodium phosphite or a sodium hypophosphite, respectively, in the presence of water to precipitate sodium chloride crystals and form the acid. The acid is separated from the sodium chloride crystals and can be passed through an anion exchange column that is preferably loaded with phosphite or hypophosphite ions, respectively, to remove residual chloride ions.

8 Claims, 1 Drawing Sheet

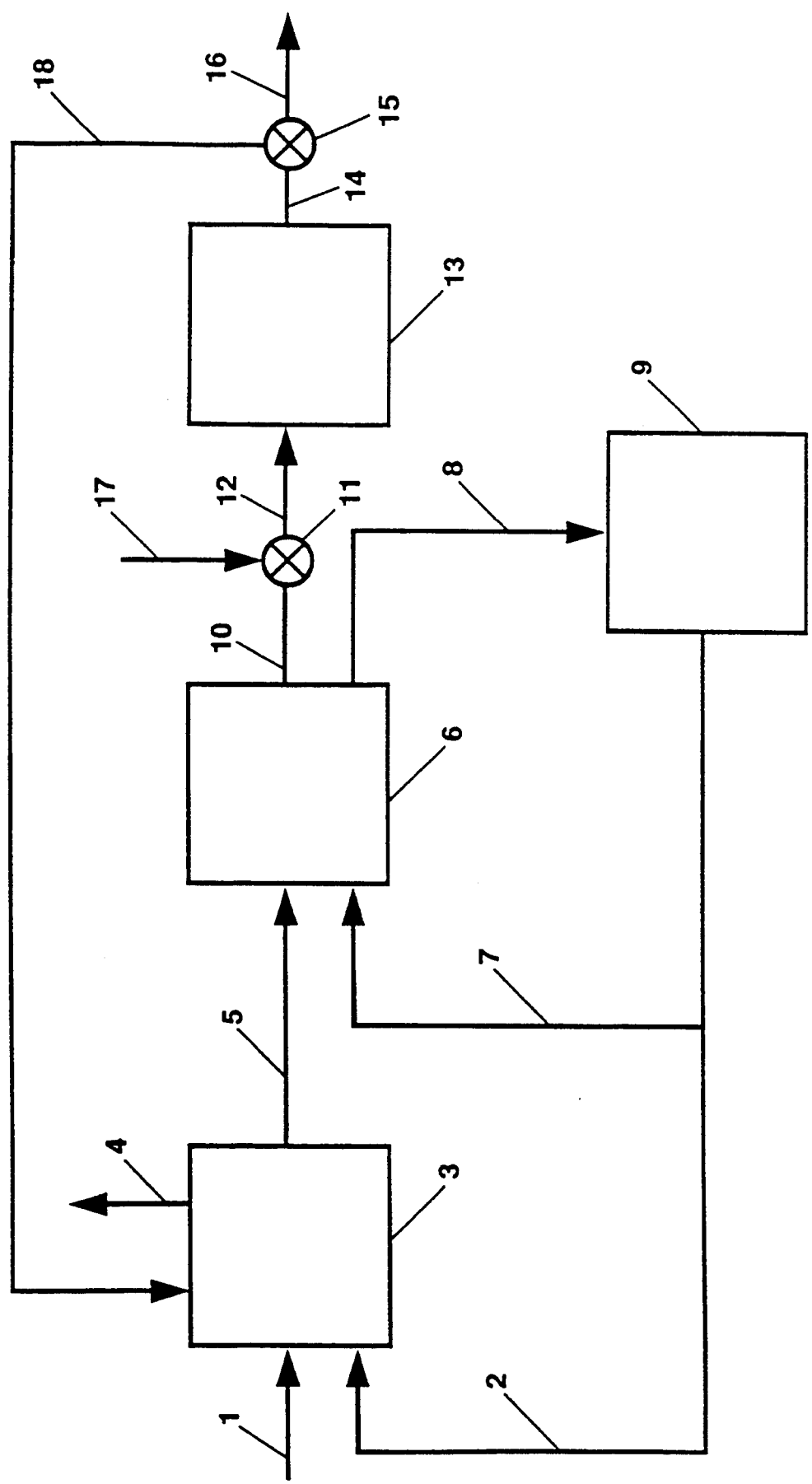

ZERO DISCHARGE PROCESS FOR MANUFACTURING OF PHOSPHOROUS ACID AND HYPOPHOSPHOROUS ACID

BACKGROUND OF THE INVENTION

This invention relates to a process for manufacturing phosphorous acid or hypophosphorous acid from a sodium phosphite or sodium hypophosphite, respectively. In particular, it relates to the reaction of a sodium phosphite or sodium hypophosphite with hydrogen chloride to precipitate sodium chloride and form phosphorous acid or hypophosphorous acid, respectively, which can be purified by anion exchange.

Phosphorous acid, $H_3PO_3$, has a number of industrial applications including as an intermediate in the manufacture of water treatment sequestrants, and drilling fluid components in selected down-hole oil well applications, and for use in pH adjustments in the sodium hypophosphite process. Phosphorous acid is usually produced by reacting water with phosphorus trichloride, but that is an expensive process due to the high cost of phosphorus trichloride. Phosphorous acid can also be derived as a by-product of reactions that produce alkyl chlorides, but phosphorous acid made by those processes is contaminated with organic materials, which reduces its value or requires downstream organic removal steps.

Hypophosphorous acid, $H_3PO_2$, also has a number of industrial applications such as, for example, in making polymer stabilizers and veterinary medicines, and as a reducing agent for the precipitation of metal ions from solution, converting them to elemental metals. Hypophosphorous acid can be made by reacting sulfuric acid with sodium hypophosphite, which produces hypophosphorous acid and sodium sulfate. That process requires refrigeration to a temperature of about $-40°$ C. in order to precipitate the sodium sulfate. The hypophosphorous acid liquor must then be treated with barium to precipitate any residual sulfate ions as barium sulfate. These procedures add considerably to the cost of producing hypophosphorous acid, and result in the need to dispose of barium sulfate "mud" and hydrated forms of sodium sulfate.

Hypophosphorous acid can also be made by passing sodium hypophosphite through a cation exchange column, where sodium is exchanged for hydrogen. This process requires a very large cation exchange column, and also generates an aqueous waste stream that contains phosphorus, which is difficult to dispose of.

SUMMARY OF THE INVENTION

We have discovered an inexpensive and environmentally preferable method of making phosphorous acid or hypophosphorous acid. In the process of this invention, sodium phosphite, sodium dihydrogen phosphite, or sodium hypophosphite is treated with hydrogen chloride, which results in the precipitation of sodium chloride, which is removed by filtration. The filtrate can be passed through an anion exchange resin to remove residual chloride. The products of the process are phosphorous acid or hypophosphorous acid and sodium chloride or brine solution. Because the anion exchange resin can be regenerated with dilute sodium hydroxide, which removes chloride ions from the resin as sodium chloride which can re-enter the main process and can later be precipitated and filtered, the process does not produce any waste streams and therefore is a zero discharge process. The process requires comparatively small amounts of capital, principally because the anion exchanger can be relatively small. The salt or brine that is produced is of such high purity that it can be used in a chlor-alkali plant for making chlorine/caustic soda or sodium chlorate. Alternatively, the salt can, with little or no treatment, be suitable for food grade uses.

Another advantage of the process of this invention is that it uses relatively inexpensive materials. Hydrochloric acid is often produced as a by-product of other manufacturing processes and is relatively inexpensive. If phosphorous acid is being made, the starting material can be sodium phosphite, which can be made by reacting sodium carbonate with calcium phosphite. Calcium phosphite is a by-product produced in the manufacture of sodium hypophosphite, and has heretofore been disposed of as an industrial waste.

BRIEF DESCRIPTION OF THE DRAWING

The accompanying drawing is a block diagram illustrating a certain presently preferred embodiment of the process of this invention.

DESCRIPTION OF THE PREFERRED EMBODIMENT

The following description will be for a process of making hypophosphorous acid. The process for making phosphorous acid is similar except that the starting material is a sodium phosphite instead of sodium hypophosphite and anion exchange is usually not needed.

In the drawing, sodium hypophosphite from line 1 and hydrochloric acid from line 2 are reacted in reactor 3 to produce sodium chloride and hypophosphorous acid. The reaction mixture can be concentrated by evaporating water through line 4, which results in additional precipitation of the sodium chloride. The slurry of sodium chloride crystals in a solution of hypophosphorous acid passes through line 5 to filter 6 which separates the sodium chloride crystals from the solution of hypophosphorous acid. The crystals can be washed with hydrochloric acid from line 7 to remove any residual hypophosphorous acid. The wash liquor is collected in line 8 is and is stored in tank 9 for recycling to reactor 3. Salt on filter 6 can be removed from the filter as crystals, or it can be dissolved with water or unsaturated brine to form a brine product suitable for uses such as in the chlor-alkali industry.

The solution of hypophosphorous acid then passes through line 10, three-way valve 11, and line 12 into anion exchange column 13 where any chloride remaining in solution is exchanged by anion exchange column 13. The product hypophosphorous acid leaves anion exchange column 13 through line 14, three-way valve 15, and line 16.

Regeneration of anion exchange column 13 can be accomplished by turning valve 11 to shut off flow through line 10 and permit flow through line 17, and turning valve 15 to stop flow through line 16 and permit flow through line 18. Sodium hydroxide is then passed through line 17 to replace the chloride or hypophosphite ions on the anion exchange column with hydroxyl ions. The water and sodium chloride and sodium hypophosphite that leave anion exchange column 13 in line 18 can be recycled to reactor 3. Valves 11 and 15 are then turned so that the flow is once again through lines 10, 12, 14, and 16. When hypophosphorous acid from reactor 13 passes through line 12 the hydroxyl ions on anion exchange column 13 are exchanged for hypophosphite ions and are neutralized to form water. The anion exchange column is now regenerated. As the process continues, the hypophosphite ions on the column will once again be displaced by chloride ions. Regeneration of the column can also be accomplished using anions other than the anion of the acid being formed, but it is preferable to use that anion to avoid introducing different anions into the process.

The process of this invention requires the use of hydrogen chloride as a starting material. The hydrogen chloride can be in the form of hydrogen chloride gas or it can be solution in water, hydrochloric ("muriatic") acid. If hypophosphorous acid is being made, the starting material normally used is sodium hypophosphite, $NaH_2PO_2$, or its monohydrate, $NaH_2PO_2 \cdot H_2O$. If phosphorous acid is being made, the phosphite used is either sodium phosphite, $Na_2HPO_3$, sodium dihydrogen phosphite, $NaH_2PO_3$, hydrates thereof, or mixtures thereof. Sodium phosphite is preferred to sodium dihydrogen phosphite because it can be readily made from calcium phosphite, a waste product, by reaction with sodium carbonate. The sodium phosphite or hypophosphite can be in the form of solid crystals, a slurry, or a solution. If anhydrous hydrochloric acid (i.e., hydrogen chloride gas) is used, it is preferable to use a solution of the sodium phosphite or hypophosphite as some water is needed to keep the product acid in solution so that the NaCl crystals can be separated from it. But if muriatic acid is used, crystalline sodium phosphite or hypophosphite is preferred to reduce the amount of water it is necessary to evaporate.

The amount of hydrochloric acid used should be slightly in excess of stoichiometric compared with the molar sodium content of sodium phosphite or hypophosphite. No more than about a 10 mole % excess of hydrogen chloride is desirable. It is preferable to use an amount of hydrogen chloride that is about 2 to about 5 mole % in excess of stoichiometric as some excess is desirable to maximize precipitation of sodium as sodium chloride, but too much excess means more chloride must be removed by the anion exchange column.

After the reaction has occurred in reactor 3, it is preferable to have a concentration of hypophosphorous acid of about 75 to about 85 wt % because at concentrations less than about 75 wt % the sodium level in the acid rises to unacceptable levels, and obtaining concentrations greater than about 85 wt % requires evaporation of water at high temperatures which may cause slow but measurable decomposition of the hypophosphorous acid into phosphorous acid and phosphine, a flammable and poisonous gas. To avoid the decomposition of the hypophosphorous acid, it is preferable to operate reactor 3 below a temperature of about 75° C., and a temperature less than 65° C. is preferred. A vacuum, such as about 50 mm or less of mercury, is necessary to effect the low temperature evaporation of water within a reasonable amount of time. However, if phosphorous acid is being prepared, higher temperatures, while not preferred, can be used since phosphorous acid is more stable and does not decompose as readily into phosphine.

The following examples further illustrate this invention.

EXAMPLE 1

(Preparation of Hypophosphorous Acid)

To a stirred solution of 717.8 g of a 32% hydrochloric acid solution in a 3-necked 2 liter flask was added 615.42 g of powdered sodium hypophosphite. The temperature of the solution rose about 2° C. Water was removed from the stirred reaction mixture by reduced pressure distillation at a temperature of about 55° ±7° C. at a pressure of 44 to 72 mm Hg until a hypophosphorous acid concentration of about 80 wt %. After cooling to room temperature, sodium chloride that had precipitated was filtered from the reaction mixture. The filter cake was washed twice with 32 wt % hydrochloric acid. The recovered product contained 355.7 g of hypophosphorous acid. The analysis showed that the product contained 0.9 wt % sodium, 3.2 wt % chloride, and 80.96 wt % hypophosphorous acid.

Chloride ion was removed from hypophosphorous acid using an ion-exchange column (height 22¼", diameter 1⅜"). The column was packed with Rohm and Haas Resin IRA-410 in the chloride form and was regenerated using 5% NaOH.

The results from using this column at different $H_3PO_2$ and $Cl^-$ concentrations are shown below.

| Influent Composition | | Effluent Composition | |
|---|---|---|---|
| %$H_3PO_2$ | % Cl | %$H_3PO_2$ | % Cl |
| 46 | 3.0 | 49.6 | 0.06 |
| 46 | 3.0 | 46.7 | 0.09 |
| 71 | 5.9 | 52.6 | 0.02 |

EXAMPLE 2

(Preparation of Phosphorous Acid)

Phosphorous acid was made by reacting a sodium phosphite solution with hydrochloric acid (aqueous or anhydrous). Sodium phosphite was obtained by reacting calcium phosphite (hypo mud) with soda ash and filtering off the calcium carbonate wet cake (see Wisnouskas & Ho U.S. Pat. No. 4,380,531).

A sodium phosphite and hydrochloric acid (5% excess over stoichiometric) reaction mixture was concentrated to yield a desired strength of phosphorous acid by evaporating water from the reaction mixture. Water removal was carried out by an atmospheric pressure or reduced pressure distillation. The resulting concentrated phosphorous acid solution was cooled to room temperature and filtered to remove sodium choride. The wet sodium chloride filter cake was washed with hydrochloric acid and the filtrate was recycled.

The following table gives the results.

| Sodium Phosphite Solution | | | | Hydrochloric Acid (grams) | | Distillation Conditions | Phosphorous Acid | | | |
|---|---|---|---|---|---|---|---|---|---|---|
| Amount (grams) | P (wt %) | Na (wt %) | $Na_2HPO_3$ (wt %) | 37 wt % | Anhydrous | | Amount (grams) | $H_3PO_3$ (wt %) | Na (wt %) | Cl (wt %) |
| 668.9 | 3.65 | 6.54 | 14.84 | 202 | | Atmospheric | 48.1 | 72 | 0.9 | 1.3 |
| 600.5 | 4.2 | 7.5 | 17.1 | 216 | | 50 mm Hg | 116.3 | 47 | 1.0 | 7.0 |
| 600.2 | 4.2 | 7.5 | 17.1 | | 81.7 | Atmospheric | 86.3 | 60 | 0.8 | 4.1 |

-continued

| Sodium Phosphite Solution | | | | Hydrochloric Acid (grams) | | Distillation Conditions | Phosphorous Acid | | | |
|---|---|---|---|---|---|---|---|---|---|---|
| Amount (grams) | (wt %) | | | | | | Amount (grams) | (wt %) | | |
| | P | Na | Na$_2$HPO$_3$ | 37 wt % | Anhydrous | | | H$_3$PO$_3$ | Na | Cl |
| 600.0 | 4.2 | 7.5 | 17.1 | 205 | | 50 mm Hg | 79.2 | 63 | 0.5 | 3.9 |

The table shows that the process of this invention is effective in producing phosphorous acid.

We claim:

1. A method of making hypophosphorous acid comprising
   (A) reacting hydrogen chloride with an aqueous slurry of sodium hypophosphite containing sufficient sodium hypophosphite crystals to produce sodium chloride crystals, where the amount of hydrogen chloride used is between stoichiometric and about 10 mole % in excess of the stoichiometric amount needed to react with said sodium hypophosphite;
   (B) evaporating water under vacuum at a temperature less than 75° C. to produce a solution of about 75 to about 85 wt % of said hypophosphorous acid;
   (C) separating said sodium chloride crystals from said hypophosphphorous acid; and
   (D) passing said hypophosphorous acid through an anion exchange resin loaded with hypophosphite ion.

2. A method according to claim 1 wherein the amount of said hydrogen chloride is about 2 to about 5 mole % in excess of stoichiometric.

3. A method according to claim 1 including the additional steps of regenerating said anion exchange resin by passing sodium hydroxide through it, then passing hypophosphorous acid through it.

4. A method of making hypophosphorous acid comprising:
   (A) in a reactor, reacting hydrogen chloride with an aqueous slurry of a sodium hypophosphite selected from the group consisting of NaH$_2$PO$_2$, NaH$_2$PO$_2$.H$_2$O, and mixtures thereof, to produce a slurry of a solution of hypophosphorous acid and solid sodium chloride, where the amount of hydrogen chloride used is between stoichiometric and about 10 mole % in excess of the stoichiometric amount needed to react with said sodium hypophosphite;
   (B) heating said slurry at a temperature of less than 65° C. under vacuum to evaporate water therefrom;
   (C) passing said slurry over a filter to separate said solution from said solid sodium chloride;
   (D) passing said solution through an anion exchange column to remove chloride ions therefrom; and
   (E) when necessary, regenerating said anion exchange resin by washing said resin with a solution of sodium hydroxide and recycling the effluent from said wash to said reactor.

5. A method according to claim 4 wherein said solid sodium chloride on said filter is washed with hydrochloric acid and the effluent from said wash is recycled to said reactor.

6. A method according to claim 4 wherein said anion exchange resin is initially loaded with hypophosphite ions.

7. A method according to claim 4 wherein the amount of said hydrogen chloride is about 2 to about 5 mole % in excess of stoichiometric.

8. A method according to claim 4 wherein water in said reaction mixture is evaporated to produce a concentration of said acid of about 75 to about 85 wt %.

* * * * *